US009049447B2

(12) United States Patent
Millar et al.

(10) Patent No.: US 9,049,447 B2
(45) Date of Patent: Jun. 2, 2015

(54) VIDEO CODING

(75) Inventors: Greg Millar, Coarsegold, CA (US); Farzin Aghdasi, Clovis, CA (US); Lei Wang, Clovis, CA (US); Chien-Min Huang, Clovis, CA (US)

(73) Assignee: Pelco, Inc., Clovis, CA (US)

( * ) Notice: Subject to any disclaimer, the term of this patent is extended or adjusted under 35 U.S.C. 154(b) by 121 days.

(21) Appl. No.: 12/982,602

(22) Filed: Dec. 30, 2010

(65) Prior Publication Data

US 2012/0169923 A1    Jul. 5, 2012

(51) Int. Cl.
| | | |
|---|---|---|
| H04N 7/12 | (2006.01) | |
| H04N 19/23 | (2014.01) | |
| H04N 19/61 | (2014.01) | |
| H04N 21/647 | (2011.01) | |
| H04N 21/2385 | (2011.01) | |
| H04N 21/2662 | (2011.01) | |
| H04N 21/462 | (2011.01) | |
| H04N 19/172 | (2014.01) | |
| H04N 19/176 | (2014.01) | |
| H04N 19/00 | (2014.01) | |

(Continued)

(52) U.S. Cl.
CPC .......... *H04N 19/23* (2014.11); *H04N 21/64769* (2013.01); *H04N 21/2385* (2013.01); *H04N 21/2662* (2013.01); *H04N 21/4621* (2013.01); *H04N 21/64738* (2013.01); *H04N 7/50* (2013.01); *H04N 7/26271* (2013.01); *H04N 7/26244* (2013.01); *H04N 7/26335* (2013.01); *H04N 7/26111* (2013.01); *H04N 7/26643* (2013.01); *H04N 7/12* (2013.01)

(58) Field of Classification Search
CPC .................... H04N 21/64769; H04N 21/2385; H04N 21/2662; H04N 21/4621; H04N 21/64738; H04N 7/50; H04N 7/26271; H04N 7/26244; H04N 7/26335; H04N 7/26643; H04N 7/26111
USPC ............. 375/240.01, 240.02, 240.24, 240.25, 375/240.26; 382/239, 243, 235, 233
See application file for complete search history.

(56) References Cited

U.S. PATENT DOCUMENTS

| | | | |
|---|---|---|---|
| 6,084,982 A | 7/2000 | Challapali et al. | |
| 6,169,821 B1 * | 1/2001 | Fukunaga et al. | ............ 382/239 |
| 7,321,624 B1 * | 1/2008 | Allmen et al. | ........... 375/240.08 |

(Continued)

FOREIGN PATENT DOCUMENTS

JP    2010-278968 A    12/2010

OTHER PUBLICATIONS

Strat, Thomas M., "Object-Based Encoding: Next-Generation Video Compression," 2001 Proceedings of Workshop and Exhibition on MPEG-4, pp. 53-57.

(Continued)

*Primary Examiner* — Shawn An
(74) *Attorney, Agent, or Firm* — Hunter Clark PLLC

(57) ABSTRACT

Techniques are discussed for providing mechanisms for coding and transmitting high definition video, e.g., over low bandwidth connections. In particular, foreground-objects are identified as distinct from the background of a scene represented in a plurality of video frames received from a video source, such as a camera. In identifying foreground-objects, semantically significant and semantically insignificant movement (e.g., repetitive versus non-repetitive movement) is differentiated. Processing of the foreground-objects and background proceed at different update rates or frequencies.

12 Claims, 8 Drawing Sheets

(51) Int. Cl.
*H04N 19/102* (2014.01)
*H04N 19/20* (2014.01)

(56) References Cited

U.S. PATENT DOCUMENTS

| | | | |
|---|---|---|---|
| 7,480,414 B2 | 1/2009 | Brown et al. | |
| 7,567,513 B2* | 7/2009 | Cho | 370/235 |
| 7,583,275 B2 | 9/2009 | Neumann et al. | |
| 7,827,257 B2* | 11/2010 | Chu et al. | 709/223 |
| 7,916,944 B2* | 3/2011 | Yang et al. | 382/173 |
| 8,345,157 B2* | 1/2013 | Oishi | 348/448 |
| 2002/0051491 A1 | 5/2002 | Challapali et al. | |
| 2006/0104488 A1 | 5/2006 | Bazakos et al. | |
| 2006/0204077 A1 | 9/2006 | Lim et al. | |
| 2006/0284976 A1 | 12/2006 | Girgensohn et al. | |
| 2007/0076957 A1* | 4/2007 | Wang et al. | 382/195 |
| 2008/0192820 A1* | 8/2008 | Brooks et al. | 375/240.02 |
| 2009/0087096 A1 | 4/2009 | Eaton et al. | |
| 2009/0192990 A1 | 7/2009 | Chin et al. | |
| 2009/0195382 A1 | 8/2009 | Hall | |
| 2010/0111370 A1 | 5/2010 | Black et al. | |
| 2010/0166325 A1 | 7/2010 | Sengamedu et al. | |
| 2010/0177969 A1 | 7/2010 | Huang et al. | |
| 2010/0309973 A1 | 12/2010 | Chien et al. | |
| 2011/0044536 A1 | 2/2011 | Cobb et al. | |
| 2011/0063445 A1 | 3/2011 | Chew | |
| 2012/0195363 A1* | 8/2012 | Laganiere et al. | 375/240.01 |

OTHER PUBLICATIONS

Non-Final Office Action; U.S. Appl. No. 12/982,601; Jun. 5, 2013.
Non-Final Office Action; U.S. Appl. No. 12/982,601; Dec. 5, 2012.
Final Office Action; U.S. Appl. No. 12/982,601; Nov. 15, 2013.
H. Watanabe and K. Jinzenji, Sprite coding in object-based video coding standard: MPEG-4, World Multiconference on Systemics, Proc. Cybernetics and Informatics (SCI)XIII (2001) pp. 420-425. Aug. 22-25, 2001.
M.-C. Lee, W.-G. Chen, C.-L. Lin, C. Gu, T. Markok, S. I. Zabinsky and R. Szeliski "A layered video object coding system using sprite and affine motion model", IEEE Trans. Circuits and Systems for Video Technology, vol. 7, No. 1, pp. 130-145 1997.
N. Srinivasamurthy, M. Siddaramanna and R. Rajore "Smart Codec Features in TMS320DM365," Application Report, SPRAB83—Dec. 2009.
International Search Report and Written Opinion; PCT/US2011/067787; Aug. 9, 2012.
International Search Report and Written Opinion; PCT/US2011/067732; Aug. 9, 2012.
Non-Final Office Action; U.S. Appl. No. 12/982,601; Apr. 14, 2014.
Final Office Action; U.S. Appl. No. 12/982,601; Sep. 5, 2014, 59 pgs.
Non-Final Office Action; U.S. Appl. No. 12/982,601; Mar. 24, 2015.

* cited by examiner

VIDEO CODING

CROSS REFERENCES

This application is related to U.S. Pat. Appl. Pub. No. 2012/0170803, entitled "Searching Recorded Video" filed on Dec. 30, 2010, the entire disclosure of which is incorporated by reference for all purposes.

BACKGROUND

In recent years, use of High Definition (HD) video technology has grown exponentially, and spread into many different areas. For example, many movies, television programming, and online video streams are now routinely presented in high definition. HD video technology is also increasingly being used in the area of surveillance and wireless communications. For instance, HD capable cameras can provide highly detailed video streams, and enable the effective monitoring of remote sites, such as industrial parks.

HD video for surveillance and wireless communication applications use significant amounts of bandwidth. Some remote sites, however, can at most, reliably deliver a bandwidth of 128 Kbps. Such bandwidth capacities can make delivering high quality video streams nearly impossible.

To help facilitate the use of HD video, many video compression schemes (e.g., MPEG-1/2, MPEG-4, and H.264) exist to reduce the size of raw high definition video.

BRIEF SUMMARY

An example transmission system includes a processor configured to receive a plurality of frames; analyze the plurality of frames; identify foreground-object portions that are distinct from a background portion; transmit foreground-object information for each of the plurality of frames; and selectively transmit background information for less than all of the plurality of frames, wherein the background information is transmitted at a periodic rate.

Certain implementations of such a system can include one or more of the following features. The foreground-object portions include semantically significant moving objects.

An example method of transmitting video over a network to which computer devices can connect includes receiving a plurality of video data from a video source; analyzing the plurality of video data; identifying the presence of foreground-object portions that are distinct from background portions in the plurality of video data; processing data associated with at least one identified foreground-object portion based on a first update rate; processing data associated with the background portions based on a second update rate; transmitting data associated with at least one identified foreground-object portion based on the first update rate; and transmitting data associated with the background portions based on the second update rate, wherein the first update rate is greater than the second update rate.

Certain implementations of such a method can include one or more of the following features. Identifying the foreground-object portions includes identifying semantically significant movement based on a Gaussian mixture model. If a video data portion includes semantically significant movement, the portion is identified as a foreground-object portion. Processing data associated with the at least one foreground-object portion includes determining whether the at least one foreground-object portion is noise. The first update rate is thirty frames per second. Processing data associated with the at least one foreground-object portion includes: computing a residual object image for the foreground-object portion; encoding the residual object image to produce an encoded residual object image; decoding the encoded residual object image to produce a decoded residual object image; and generating an object image based on the decoded residual object image. The residual object image is based on a reference background image or a previously reconstructed frame. Processing data associated with the background portions includes: computing a residual background image for a background portion based on a first reference background image; encoding the residual background image to produce an encoded residual background image; decoding the encoded residual background image to produce a decoded residual background image; generating a second reference background image based on the decoded residual background image and the first reference background image. The method further includes transmitting event data, wherein the event data indicates whether a foreground-object portion has entered or left a scene represented by the plurality of video data. Transmitting data associated with the background portions includes dividing a residual background image for a background portion into a plurality of slices; and transmitting each slice in the plurality of slices at intervals. Transmitting data associated with the background portions includes transmitting a residual background region image and location information for the region image following a determination that the at least one foreground-object is stationary or a determination that a previously identified foreground-object has left a scene represented by the plurality of video data.

An example non-transitory computer readable medium is encoded with one or more computer readable instructions that, when executed by a processor, cause the processor to analyze video data from a plurality of images; identify the presence of foreground-object portions that are distinct from a background portion in the video data; transmit first portions of the video data, of different images, associated with at least one identified foreground-object portion at a first update rate; and transmit second portions of the video data, of different images, associated with the background portion at a second update rate, wherein the first update rate is greater than the second update rate.

Certain implementations of such a computer readable medium can include one or more of the following features. The instructions that cause the processor to identify the presence of foreground-object portions cause the processor to identify semantically significant movement using a Gaussian model. The instructions that cause the processor to identify the presence of foreground-object portions cause the processor to identify a region of semantically significant movement as a foreground-object portion. The first update rate is thirty frames per second. The instructions that cause the processor to transmit portions of data associated with the at least one identified foreground-object portion cause the processor to compute a residual object image for the foreground-object portion; encode the residual object image to produce an encoded residual object image; decode the encoded residual object image to produce a decoded residual object image; generate an object image based on the decoded residual object image; and transmit the encoded residual object image. The residual object image is computed from a reference background image or a previously reconstructed frame. The instructions that cause the processor to transmit portions of data associated with the background portion cause the processor to compute a residual background image for the background portion based on a first reference background image; encode the residual background image to produce an encoded residual background image; decode the encoded residual background image to produce a decoded residual background image; generate a second reference background image based on the decoded residual background image and the first reference background image; and transmit the encoded residual background image. The instructions that cause the processor to transmit the encoded residual background image cause the processor to divide the encoded residual background image into a plurality of slices; and transmit each slice in the plurality of slices at intervals.

An example non-transitory computer readable medium is encoded with one or more computer readable instructions that, when executed by a processor, cause the processor to determine a data type for each of a plurality of received data, wherein data in the plurality of the received data associated with a moving foreground-object data type is received at a first update rate and data in the plurality of the received data associated with a background data type is received at a second update rate, wherein the first update rate is greater than the second update rate; process each of the plurality of received data based on a determined data type; and generate at least one video frame using moving foreground-object data that is based on a first video frame associated with a first time and background data that is based on a second video frame associated with a second time, wherein the first time is later than the second time.

Certain implementations of such a computer readable medium can include one or more of the following features. The instructions that cause the processor to process data based on a determined data type cause the processor to decode the data to produce a decoded object image; and store the decoded object image in an objects list.

Items and/or techniques described herein can provide one or more of the following capabilities, as well as other capabilities not mentioned. In some implementations, high definition video with acceptable frame rates can be coded and distributed over low bandwidth connections. It may be possible for an effect noted above to be achieved by means other than that noted, and a noted item/technique may not necessarily yield the noted effect.

In the figures, components with similar relevant characteristics and/or features can have the same reference label.

DETAILED DESCRIPTION

Techniques are discussed herein for providing mechanisms for coding and transmitting high definition video, e.g., over low bandwidth connections. In particular, foreground-objects are identified as distinct from the background of a scene represented by a plurality of video frames. In identifying foreground-objects, semantically significant and semantically insignificant movement (e.g., non-repetitive versus repetitive movement) is differentiated. For example, the swaying motion of a tree's leaves being minor and repetitive, can be determined to be semantically insignificant and to belong in a scene's background. Processing of the foreground-objects and background proceed at different update rates or frequencies. For example, foreground-objects can be updated 30 or 60 times per second. By contrast, a background is updated less frequently, e.g., once every 10 minutes. In some implementations, if no foreground-objects are identified, no live video is transmitted (e.g., if no motion is detected, I-frames are not configured to be repeatedly sent).

Techniques described herein take advantage of the fact that, in the area of surveillance and wireless communications, updating video of semantically significant movement at a high frame rate is sufficient. While many coding schemes are optimized for entertainment applications, in surveillance applications, minor and repetitive changes in a video's background, such as the waving of a flag, are typically not important. By omitting the transmission of semantically insignificant movement in the background, and by reducing the rate at which the background is updated, the transmission of high definition video over low bandwidth connections is facilitated.

Techniques described herein can be used to communicate high definition video over various communication systems. For example, high definition video can be transmitted over various wired and wirelesss communications systems, such as Ethernet-based, Coaxial-based, Powerline-based, WiFi-based (802.11 family standards), Code Division Multiple Access (CDMA), Time Division Multiple Access (TDMA), Frequency Division Multiple Access (FDMA), Orthogonal FDMA (OFDMA), Single-Carrier FDMA (SC-FDMA) systems, etc.

As used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). A wireless communication network does not have all communications transmitted wirelessly, but is configured to have at least some communications transmitted wirelessly.

Figure 1:
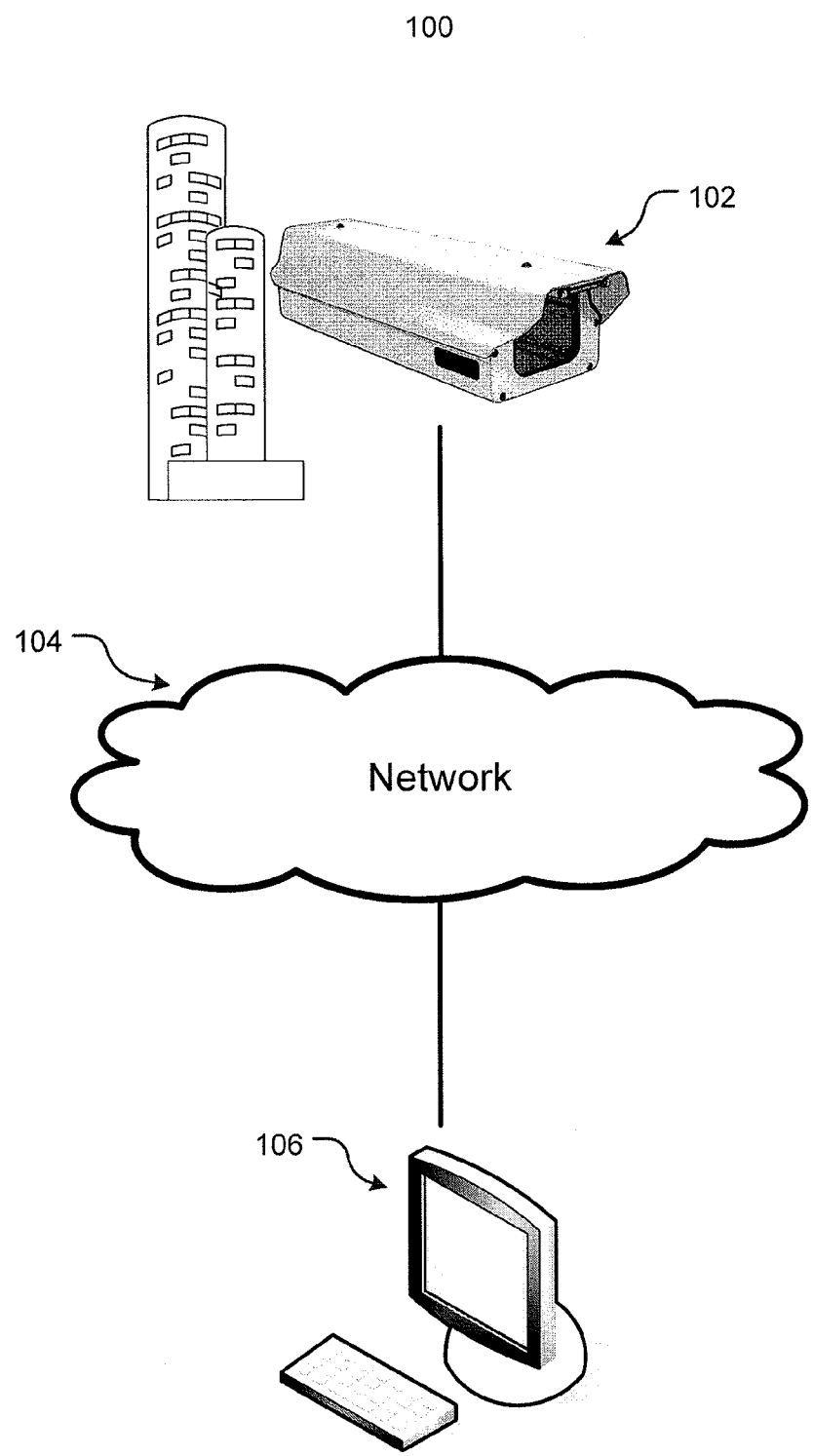
FIG. 1 is a simplified diagram of a high definition video transmission system, including a transmitter and a receiver.

Referring to FIG. 1, a simplified diagram of a video transmission system, including a transmitter and a receiver, is shown. The video transmission system 100 includes a transmitter 102, a network 104, and a receiver 106. The transmitter 102 is preferably a device for encoding and transmitting, e.g., high definition video. For example, the transmitter 102 can be a video capturing device (e.g., a computing device including a camera, an intelligent camera, a video grabber, etc.), a computing device (e.g., desktop computer, laptop, tablet device, computer server, a video transcoder, etc.) connected to one or more video capturing devices (e.g., external cameras) and/or video encoding devices, a module of a video capturing device, a module of a computing device, and/or the like. For example, the transmitter 102 can be a module embedded within a camera or a module of a video transcoder. As used herein, video includes full-motion video and still photographs taken at intervals. The receiver 106 is preferably a device for receiving and decoding e.g., high definition video. The receiver 106 can be, for example, a desktop computer, a laptop, a tablet device, a computer server, a mobile device, a mobile telephone, a monitoring system, and/or the like.

The network 104 is preferably any suitable network for facilitating communications between two or more devices. For example, the network 104 can be a closed loop communications system, a local area network (e.g., an intranet), a wide area LAN (e.g., the Internet), and/or the like. The transmitter 102 is configured to transmit encoded images and other data to the receiver 106 through the network 104. For example, the transmitter 102 can provide the receiver 106 with a series of encoded images that can be decoded into a video stream (e.g., high definition video) for presentation to a user. To support the encoding and decoding of images, the transmitter 102 can further provide event information (e.g., an indication that a new object has appeared in a video stream, etc.) to the receiver 106.

Figure 2:
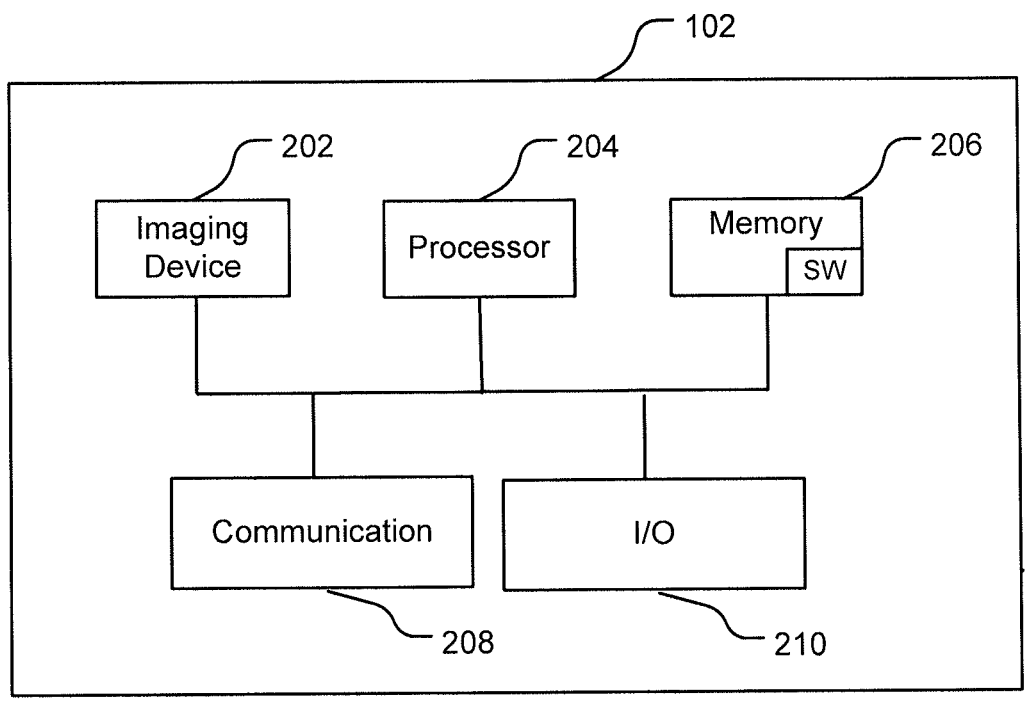
FIG. 2 is a block diagram of components of the transmitter shown in FIG. 1.

Referring to FIG. 2, a transmitter 102 includes an imaging device 202, a processor 204, a memory 206, a communication subsystem 208, and an input/output (I/O) subsystem 210. The processor 204 is preferably an intelligent hardware device, e.g., a central processing unit (CPU) such as those made by the Intel® Corporation, AMD®, ARM™, a microcontroller, an application specific integrated circuit (ASIC), a digital signal processor (DSP) (e.g., Texas Instrument's DaVinci™ family DSPs), etc. The memory 206 includes a physical and/or tangible storage medium. Such a medium can take many forms, including but not limited to, non-volatile media and volatile media. Non-volatile media include, for example, optical and/or magnetic disks, such as read-only memory (ROM). Illustratively, non-volatile media can be a hard drive, flash drive, and/or the like. Volatile media include, without limitation, various types of random access memory (RAM). Illustratively, volatile media can be dynamic random access memory (DRAM), static random access memory (SRAM), and/or the like. The memory 206 stores computer-readable, computer-executable software code containing instructions that are configured to, when executed, cause the processor 204 to perform various functions described herein. The functions implement a video transmission system. In some implementations, the memory 206 can store object and background images. For example, the memory 206 can store the images of foreground-objects detected in a plurality of frames received from the imaging device 202. The memory 206 can further store an objects list that includes identifiers, object images, references, and/or other attributes corresponding to each detected foreground-object.

The imaging device 202 is preferably any suitable combination of hardware and/or software for capturing raw video data e.g., devices based on charge-coupled device (CCD), complementary metal oxide semiconductor (CMOS) image sensor technologies, and/or thermal imaging sensors, etc. The transmitter 102 can include any number of imaging devices (including zero).

The transmitter 102 can additionally or alternatively receive raw or encoded video data from external video capturing devices and/or video encoding devices (e.g., external cameras, computing devices generating encoded video, etc.) that are directly connected to one or more ports of the communication subsystem 208 and/or one or more ports of the I/O subsystem 210.

Figure 3:
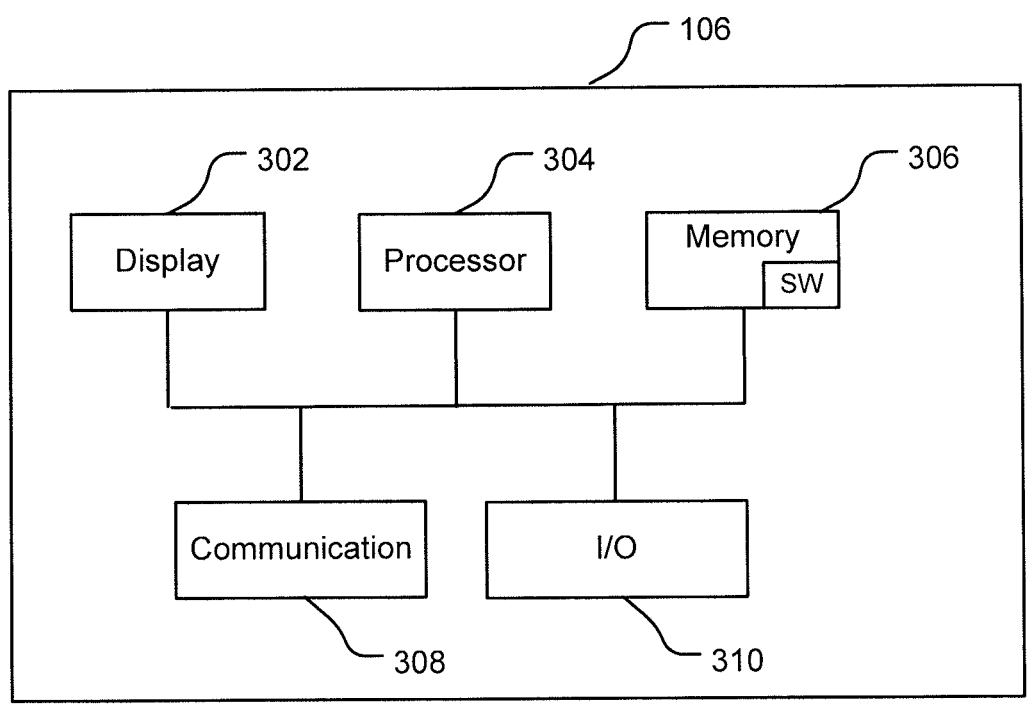
FIG. 3 is a block diagram of components of the receiver shown in FIG. 1.

The communication subsystem 208 is preferably any suitable combination of hardware and/or software for communicating with other devices (e.g., the receiver 106 shown in FIG. 3, other cameras, etc.). The communication subsystem 208 can be configured to connect to, for example, a closed-loop communications system, a local area network (e.g., an intranet), a wide area network (e.g., the Internet), etc. The I/O subsystem 210 is preferably any suitable combination of hardware and/or software for managing communications with and/or the operations of input/output devices.

Video data received by the transmitter 102 can be encoded or compressed into a digital format by the processor 204. For example, the transmitter 102 can perform analysis on, identify foreground-object and background portions in, encode, and transmit data according to one or more update rates. Encoded video data can be streamed or transmitted to the receiver 106 via the network 104.

Referring to FIG. 3, a receiver 106 includes a display 302, a processor 304, a memory 306, a communication subsystem 308, and an I/O subsystem 310. The processor 304 is preferably an intelligent hardware device, e.g., a central processing unit (CPU) such as those made by the Intel® Corporation, AMD®, ARM™, a microcontroller, an application specific integrated circuit (ASIC), a digital signal processor (DSP), etc. The memory 306 includes a physical and/or tangible storage medium. Such a medium can take many forms, including but not limited to, non-volatile media and volatile media. Non-volatile media include, for example, optical and/or magnetic disks, such as read-only memory (ROM). Illustratively, non-volatile media can be a hard drive, flash drive, and/or the like. Volatile media include, without limitation, various types of random access memory (RAM). Illustratively, volatile media can be dynamic random access memory (DRAM), static random access memory (SRAM), and/or the like. The memory 306 stores computer-readable, computer-executable software code containing instructions that are configured to, when executed, cause the processor 304 to perform various functions described herein. The functions implement a video transmission system. In some implementations, the memory 306 can store foreground-object and background images. For example, the memory 306 can store the images of foreground-objects. The memory 306 can further store an objects list that includes identifiers, object images, references, and/or other attributes corresponding to each detected foreground-object.

The communication subsystem 308 preferably is any suitable combination of hardware and/or software for communicating with other devices (e.g., the transmitter shown in FIG. 3). The communication subsystem 308 can be configured to connect to, for example, a closed-loop communications system, a local area network, a wide area network (e.g., the Internet), etc. The display 302 is preferably any suitable device for displaying images to a user, such as a cathode ray tube (CRT) monitor, a liquid crystal display (LCD) monitor, a plasma-based monitor, a projector, etc. The I/O subsystem 310 is preferably any suitable combination of hardware and/or software for managing communications with and/or the operations of input/output devices, such as a keyboard, mouse, touchpad, scanner, printer, camera, etc.

While the various configurations described herein are directed to the transmission of high definition video, it should be appreciated that modifications can be made to cover other contexts. For example, modifications can be made to enable RADAR, LIDAR and other object based detection monitoring over low bandwidth connections.

Figure 4:
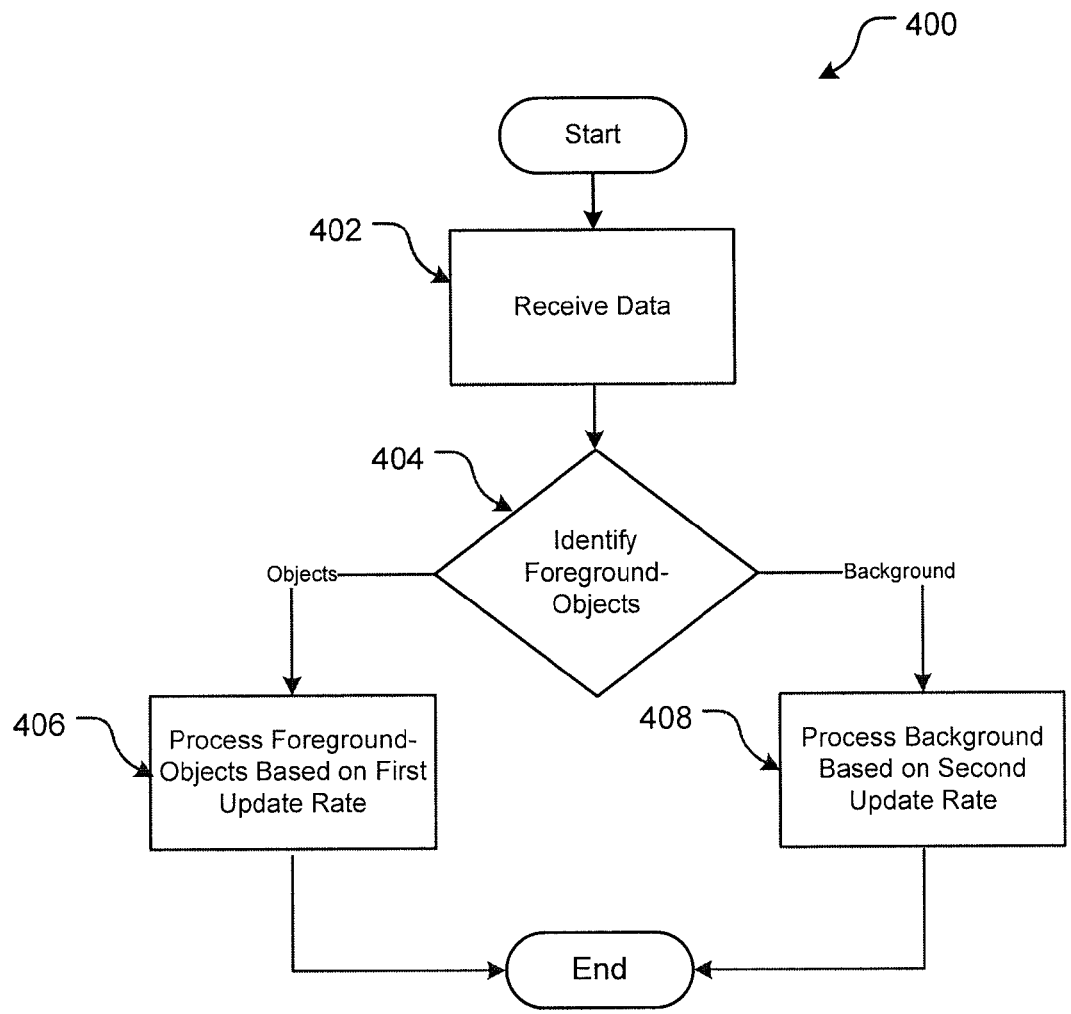
FIG. 4 is a block flow diagram of a process for encoding video.

Referring to FIG. 4, with further reference to FIGS. 1 and 2, a process 400 for encoding video includes the blocks shown. The process 400 is, however, exemplary only and not limiting. The process 400 can be altered, e.g., by having blocks added, removed, rearranged, and/or performed concurrently. For example, blocks 406 and 408 for processing foreground-objects and a background can be performed concurrently. Still other alterations to the process 400 as shown and described are possible.

Process 400 can begin at block 402 by receiving a video frame from a video source, such as an image device. At block 404, process 400 applies a Gaussian mixture model for excluding static background images and images with semantically insignificant motion (e.g., a flag waving in the wind). Based on the application of the Gaussian model, foreground-objects (i.e., objects of interest) can be identified in the received frame as distinct from the frame's background. At block 406, foreground-objects are processed based on a first update rate. For example, an update rate can specify that foreground-objects are to be updated in a video stream produced by a receiver at 30 frames per second. As a result, encoded object images for identified foreground-objects are generated and transmitted based on a rate of 30 frames per second (i.e. encoded images are generated and transmitted in a manner so that a receiver can receive the images and generate a video stream with foreground-objects that are updated at a rate of 30 frames per second). Additional information is also transmitted. For example, object events, such as the appearance, loss, or movement of an object in a given frame, can be transmitted. At block 408, portions of the frame identified as a part of the background are processed based on a second update rate. For example, an update rate may specify that a background is to be updated every fifteen minutes. As a result, an encoded background image is generated and transmitted once every fifteen minutes.

Figure 5:
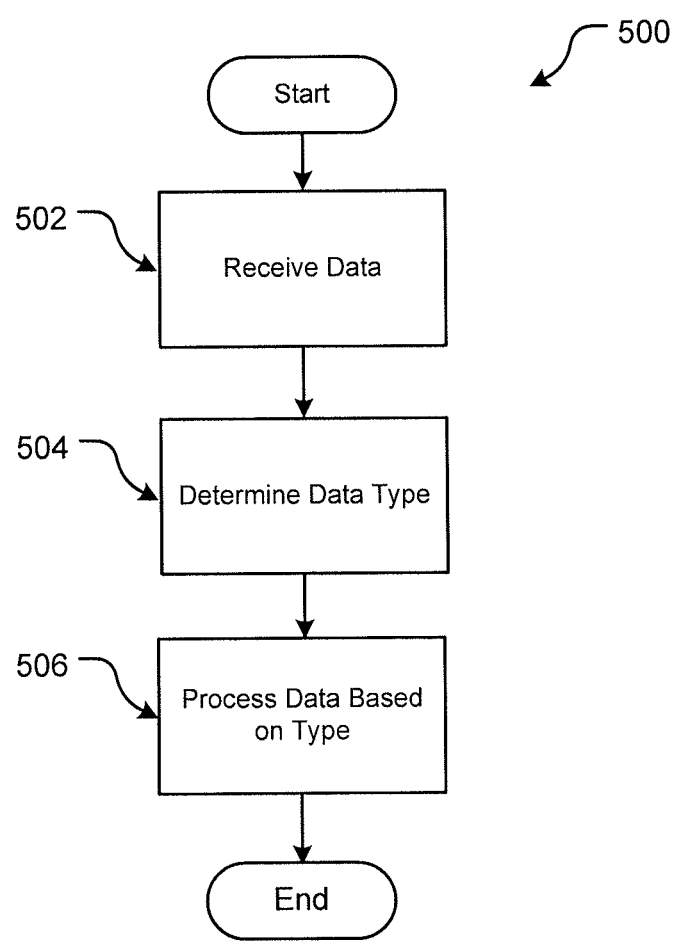
FIG. 5 is a block flow diagram of a process for decoding video.

Referring to FIG. 5, with further reference to FIGS. 1 and 3, a process 500 for decoding of video includes the blocks shown. The process 500 is, however, exemplary only and not limiting. The process 500 can be altered, e.g., by having blocks added, removed, rearranged, and/or performed concurrently.

The process 500 can begin at block 502 by receiving data. Data can include encoded images and/or event information. At block 504, the process 500 can determine a data type for the received data. Data types can include event, background, moving object, and still object types. At block 506, the received data is processed based on the identified object type. For example, if the data is of an event type, objects can be added or removed from an objects list, which is used for the tracking of objects within the frames of a video stream. As another example, if the data is of a background type, the data can be decoded and stitched to foreground-objects in order to generate a video frame that can be presented to a user. As still another example, if the data is of an object type, the data can be decoded and stitched with other images (e.g., other object images, a background image, etc.) in order to generate a video frame that can be presented to a user.

As a result of processes 400 and 500, a video stream including a plurality of video frames can be presented to a user via a receiver, such as a computer workstation. The video stream can include foreground-objects updated at a first rate and a background updated at a second rate. For example, a video stream lasting twenty minutes can include frames numbered from 0 to 36,000. Moving foreground-objects in the video stream can be configured to be updated at a rate of 30 frames per second. As such, each of the 36,000 frames generated by the receiver includes updated moving foreground-objects. In order to maintain such an update rate, foreground-object image data can be received and processed by the receiver at a rate of 30 times per second. A background in the video stream, by contrast, can be configured to be updated once every 10 minutes. As such, only frames 0, 18,000, and 36,000 include updates to the background.

Further understanding can be had by examining the more detailed processes shown in FIGS. 6-9.

Background Encoding and Transmission

Figure 6:
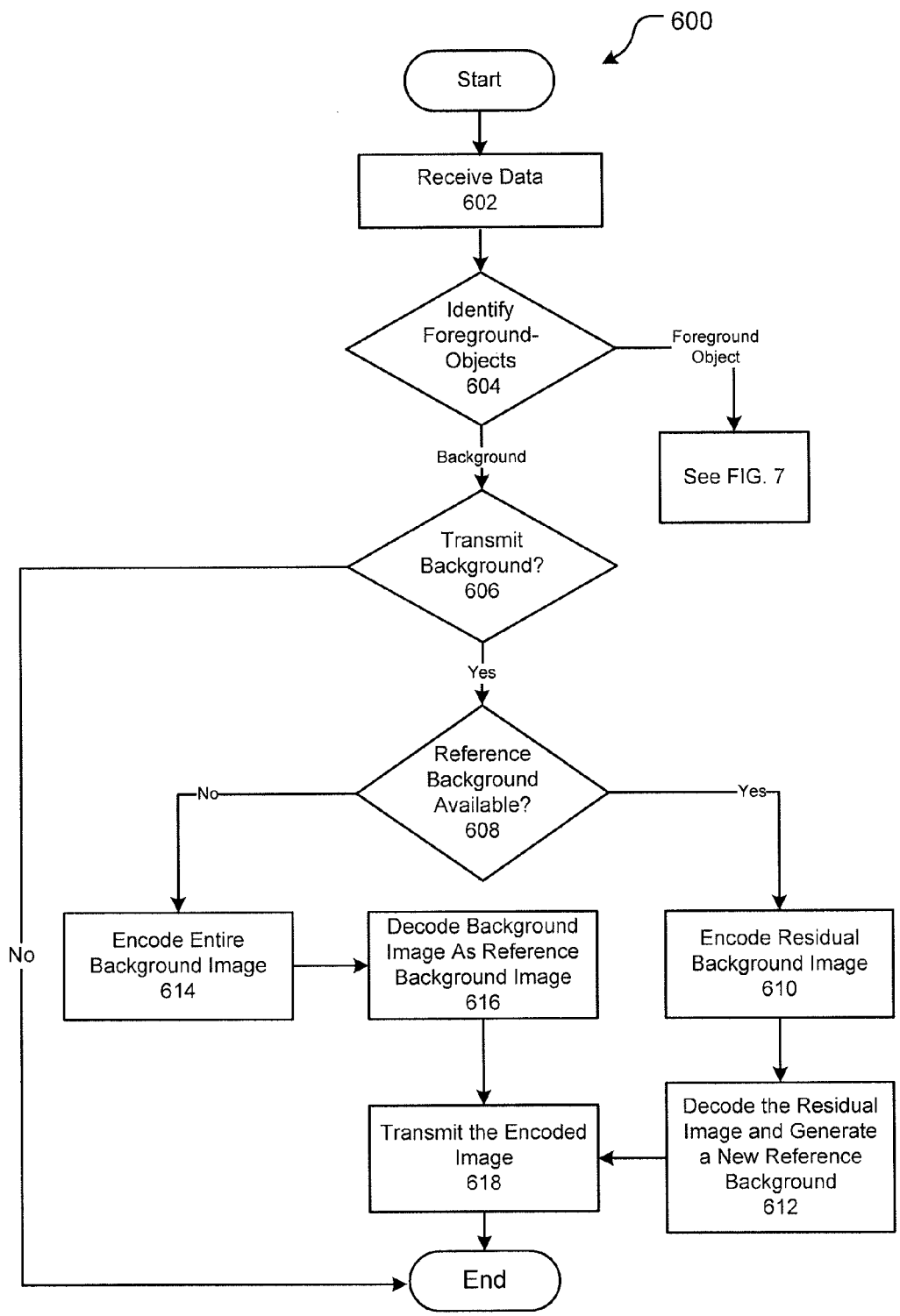
FIG. 6 is a block flow diagram of a process for encoding and transmitting a background image.

Referring to FIG. 6, with further reference to FIGS. 1 and 2, a process 600 for transmitting a background includes the blocks shown. The process 600 is, however, exemplary only and not limiting. The process 600 can be altered, e.g., by having blocks added, removed, rearranged, and/or performed concurrently. For example, block 618 for transmitting an encoded image can be performed before block 616. Still other alterations to the process 600 as shown and described are possible.

At block 602, the transmitter 102 receives a video frame (e.g., raw video data, encoded video data) from a suitable video source. For example, a frame can be captured by an image sensor of the imaging device 202. As another example, a frame can be received via the I/O subsystem 210 and/or the communication subsystem 208 (e.g., via an Ethernet port, USB port, or wireless connection of the subsystems). Video frames can be received at regular intervals or at certain frame rates. For example, the transmitter can receive frames at 30 or 60 frames per second.

At block 604, the processor 204 of the transmitter 102 identifies foreground-objects in the received frame. In doing so, the background portion of the received frame can be determined. In particular, a scene analyzer algorithm can be implemented in the processor 204. Processing by the scene analyzer is described in detail in the patent application entitled "Searching Recorded Video" (U.S. Pat. Appl. Pub. No. 2012/0170803) incorporated in the cross-reference section of this Application. In short, the analyzer can utilize a Gaussian mixture model for excluding static background images and images with repetitive motion without semantic significance (e.g., trees swaying in the wind) to identify foreground-objects. The Gaussian mixture model can be based on multiple (e.g., three or more) Gaussian curves. The Gaussian mixture model can additionally be based on previously received video frames. For example, frame portions (e.g., pixels) where repetitive motion has occurred in previous frames are identified and checked to determine whether the repetitive motion persists in the received frame. While the scene analyzer is described as utilizing a Gaussian mixture model, any model that captures stable pixels over a short period can be used.

At decision 606, the processor 204 performs a determination as to whether an encoded background image should be transmitted to the receiver 106. The processor 204 makes such a determination based on a set of criteria, such as a predefined update rate. Illustratively, an operator of the transmitter 102 can specify that background images are to be updated at the receiver 106 every ten minutes. As a result, the processor 204 generates and sends encoded background images once every ten minutes. The processor 204 can additionally or alternatively be configured to automatically adjust the rate at which background images are encoded and transmitted. For example, the processor 204 can be configured to automatically adjust the rate based on the currently available bandwidth over the network 104.

At decision 608, the processor 204 determines whether a current reference background image is available. For instance, the processor 204 can check whether a current reference background image is stored in a buffer of the memory 206. The current reference background image can be, for example, a decoded background image of a previously received frame.

If the processor 204 determines that a reference background image is available, the processor 204 encodes a residual background image for the received frame at block 610. Specifically, the processor 204 determines the differences (e.g., via performing an image subtraction process) between the background portion of the received frame and the current reference background image. The processor 204 thereafter encodes the residual background image for the background portion using a suitable coding scheme, such as H.264 intra-coding, JPEG (Joint Photographic Experts Group), JPEG 2000, etc. Because residual background images typically contain low entropy, the encoded residual background image can be highly compressed.

At block 612, the processor 204 decodes the encoded residual background image generated at block 610. The processor 204 thereafter generates a new reference background image using the decoded residual background image and the current reference background image. After generating the new reference background, the processor 204 stores the image in a buffer of the memory 206. The new reference background image can be used for the processing of later received frames. By decoding and generating new reference background images in this manner, the processor 204 synchronizes its background images with the background images generated at the receiver 106. More specifically, encoding and decoding processes often produce images with quantization errors, which can cause original images and their decoded counterparts to differ. In order to avoid this issue and maintain accurate decoding, the processor 204 performs processes to obtain the same decoded images as those generated by the receiver 106.

Referring again to decision 608, if the processor 204 determines that a current reference background image is not available, the processor 204 encodes the entire background portion for the received frame to produce an encoded background image at block 614. The processor 204 can encode the background portion using a conventional I-Frame compression method. The background portion can be encoded, for instance, using H.264 intra-coding, JPEG, JPEG 2000, etc. Illustratively, the background portion can be divided into 8×8 pixel blocks, which can be individually encoded. Each block can be transformed using a spatial-to-frequency transformation, such as discrete cosine transform (DCT). The transformed blocks can then be quantized or reduced in some fashion to decrease the amount of data.

At block 616, the processor 204 decodes the background image that was previously encoded at block 614. After decoding the background image, the processor 204 stores the image in a buffer of the memory 206 as the new reference background image. As discussed, by decoding and generating new reference background images in this manner, the processor 204 can synchronize its background images with the background images generated by the receiver 106. Doing so supports accurate decoding of the video stream.

At block 618, the processor 204 transmits the encoded background image (e.g., either the residual or entire background image) to the receiver 106 based on a specified update rate for the background (e.g., 5, 10, 15 minutes). The update rate for the background can be slower than the update rate for foreground-objects. In some implementations, a background image can be updated in a block or image based manner. For example, an encoded residual background image can be divided into and transmitted in several parts or slices. Each slice is transmitted to the receiver 106 at different times or over different interval periods. For example, the processor 204 can be configured to provide the receiver 106 with updated background images every ten minutes. The processor 204 can further be configured to divide encoded background images into five background slices. As a result, the processor 204 transmits one background slice to the receiver 106 every two minutes over a ten minute span. In doing so, the receiver 106 is able to obtain an updated background image within the specified update rate. The processor 204 can, under some circumstances, delay the transmission of a background image or slice based on defined priority rules and/or criteria. For example, the processor 204 can delay the transmission of a background slice based on the number of and/or bandwidth requirements for encoded foreground-objects currently in queue for transmission to the receiver 106.

The processor 204 transmits the encoded background image via the communication subsystem 208, which can include a connection to the receiver 106. For example, the communication subsystem 208 can be connected to the receiver 106 over a closed loop communications system. Transmission of the encoded background image is preferably facilitated by a suitable transport layer protocol, such as the transmission control protocol (TCP) or the user datagram protocol (UDP). In some implementations, the processor 204 checks with the receiver 106 whether transmission of the background image is successful.

Foreground-Object Encoding and Transmission

Figure 7:
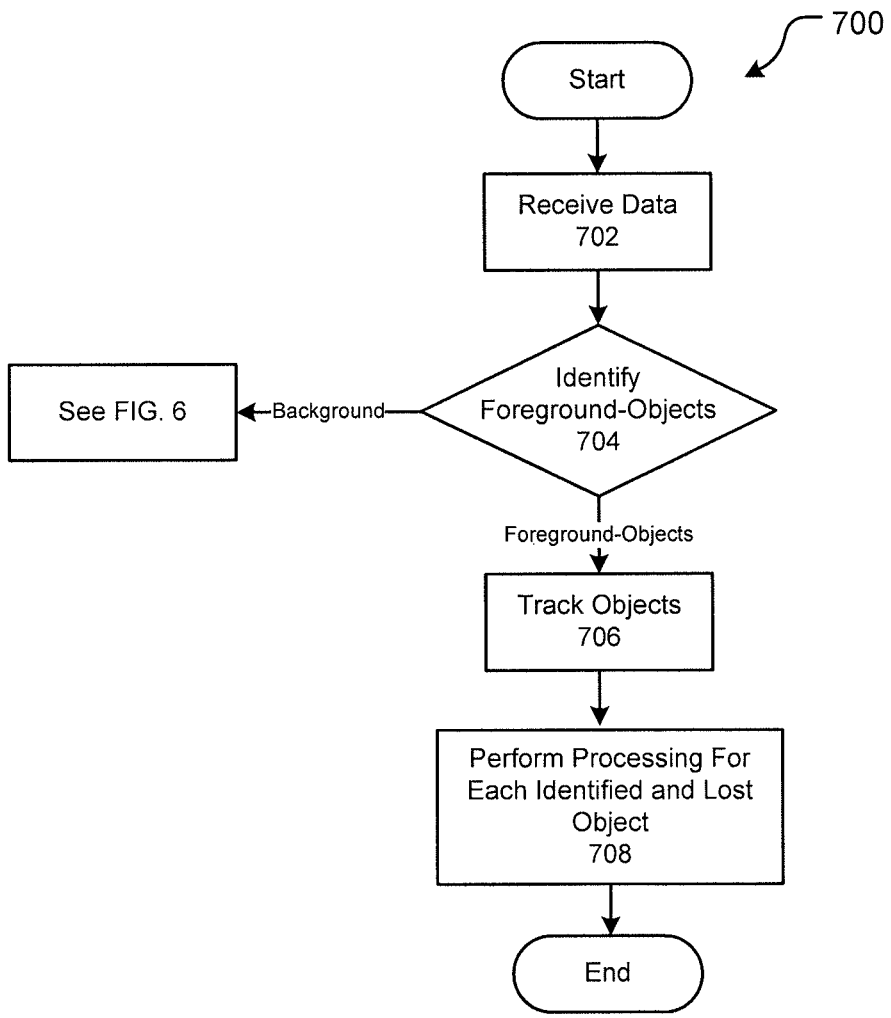
FIG. 7 is a block flow diagram of a process for encoding and transmitting foreground-object images.

Referring to FIG. 7, with further reference to FIGS. 1 and 2, a process 700 for encoding and transmitting foreground-objects includes the blocks shown. The process 700 is, however, exemplary only and not limiting. The process 700 can be altered, e.g., by having blocks added, removed, rearranged, and/or performed concurrently. Blocks 702 and 704 can be the same as blocks 602 and 604 shown in FIG. 6.

At block 702, the transmitter 102 receives a video frame from a suitable device. For example, an image sensor of the imaging device 202 can capture image data for the transmitter 102. As another example, image data can be received via the I/O subsystem 210 and/or the communication subsystem 208 (e.g., via an Ethernet port, USB port, or wireless connection of the subsystems). Video frames can be received at regular intervals or at certain frame rates. For example, the transmitter can receive frames at 30 or 60 frames per second.

At block 704, the processor 204 of the transmitter 102 identifies foreground-objects in the received video frame. In particular, a scene analyzer algorithm can be implemented in the processor 204. The analyzer utilizes a Gaussian mixture model for excluding static background images and images with repetitive motion without semantic significance (e.g., trees moving in the wind) to identify foreground pixels. The Gaussian mixture model can be based on multiple (e.g., three or more) Gaussian curves. The Gaussian mixture model can additionally be based on previously received video frames. While the scene analyzer is described as utilizing a Gaussian mixture model, any model that captures stable pixels over a short period can be used.

The processor 204 groups any identified foreground pixels into blobs using a connected components analysis. The grouped blobs represent the foreground-objects detected in the received video frame. To eliminate noise from the frame, the processor 204 removes blobs falling below a certain size threshold.

Each foreground-object is an estimate of an actual object in the received video frame. Specifically, an object can be a bounded rectangle or box that includes an actual object in the frame and portions of the actual background. For example, a received frame can include a flying bird. The object representation of the bird can be a bounded box including the bird and portions of its surroundings (e.g., parts of the sky).

In some implementations, the analyzer computes metadata for the identified foreground-objects. The metadata includes, for example, the position or coordinates of an object in the image plane, the dimensions of an object (e.g., width and height in pixels), the speed of an object, the direction of an object's motion, etc.

At block 706, the processor 204 tracks any identified foreground-objects. In particular, the processor 204 labels any identified foreground-objects by assigning the computed metadata to the objects.

Based on the labels, the processor 204 attempts to map each detected object with an object identified in a previously received frame. For example, the processor 204 can compare the position, speed, movement direction, color, object size, etc. to map an object. Illustratively, the processor 204 can estimate that, based on the upward trajectory of an object, the object would be an estimated 50 pixels below its current position in a previously received frame. Based on this determination, the processor 204 checks whether, in a previously received frame, an object is shown at the estimated position.

Through tracking the identified foreground objects, the processor 204 also determines if any objects have been lost. More specifically, the processor 204 identifies objects present in a previously received frame that are no longer present in the received frame (e.g., an object has left the field of view of the frame, moved behind another object, etc.). The processor 204 can identify lost objects in any suitable manner. For example, the processor 204 can maintain an objects list containing information for objects present in a previously received frame. If an object in the list is not found in the current frame, the processor 204 determines that the object has been lost. As another example, the processor 204 can compare the foreground-objects of a previous frame to the foreground-objects of the received frame. Based on the comparison, the processor 204 identifies any objects missing in the received frame.

In some implementations, the processor 204, in tracking the identified foreground objects, additionally filters out objects that are considered to be noise. More specifically, the processor 204 can delay the processing of a newly detected foreground object until the processor 204 has detected the presence of the foreground object in a threshold number of consecutive frames. For example, the processor 204 can be configured to delay for a period of one frame. During operation, a new foreground object may appear in frame 1. After detecting the foreground object in frame 1, the processor 204 waits and determines if the same object is detected in frame 2 before processing the object. In this way, noise, which typically disappears after one or two frames, can be filtered.

At block 708, the processor 204 processes the identified and lost foreground-objects. For example, the processor 204 can generate a lost event for each object that is identified as not present in the received frame. As another example, the processor 204 can determine if a particular identified object is moving, still, new (i.e., not identified in previous frames), and/or the like. The processor 204 can additionally compute, encode, and decode object images for the identified objects. The processor 204 can also, based on movement information, determine update rates for identified objects. Illustratively, if an identified object is moving very slowly, the processor 204 can determine that an image for the object can be updated at a slower rate (e.g., an image for the object does not need to be frequently transmitted and/or the current image for the object does not need to be transmitted). The processor 204 can furthermore transmit data for each object to the receiver 106 based on a specified update rate. The processor 204 can also process the identified and lost foreground-objects sequentially or in parallel. Process 800, shown in FIG. 8, illustrates the processing of identified foreground-objects and lost foreground-objects in greater detail.

Foreground-Object Processing

Figure 8:
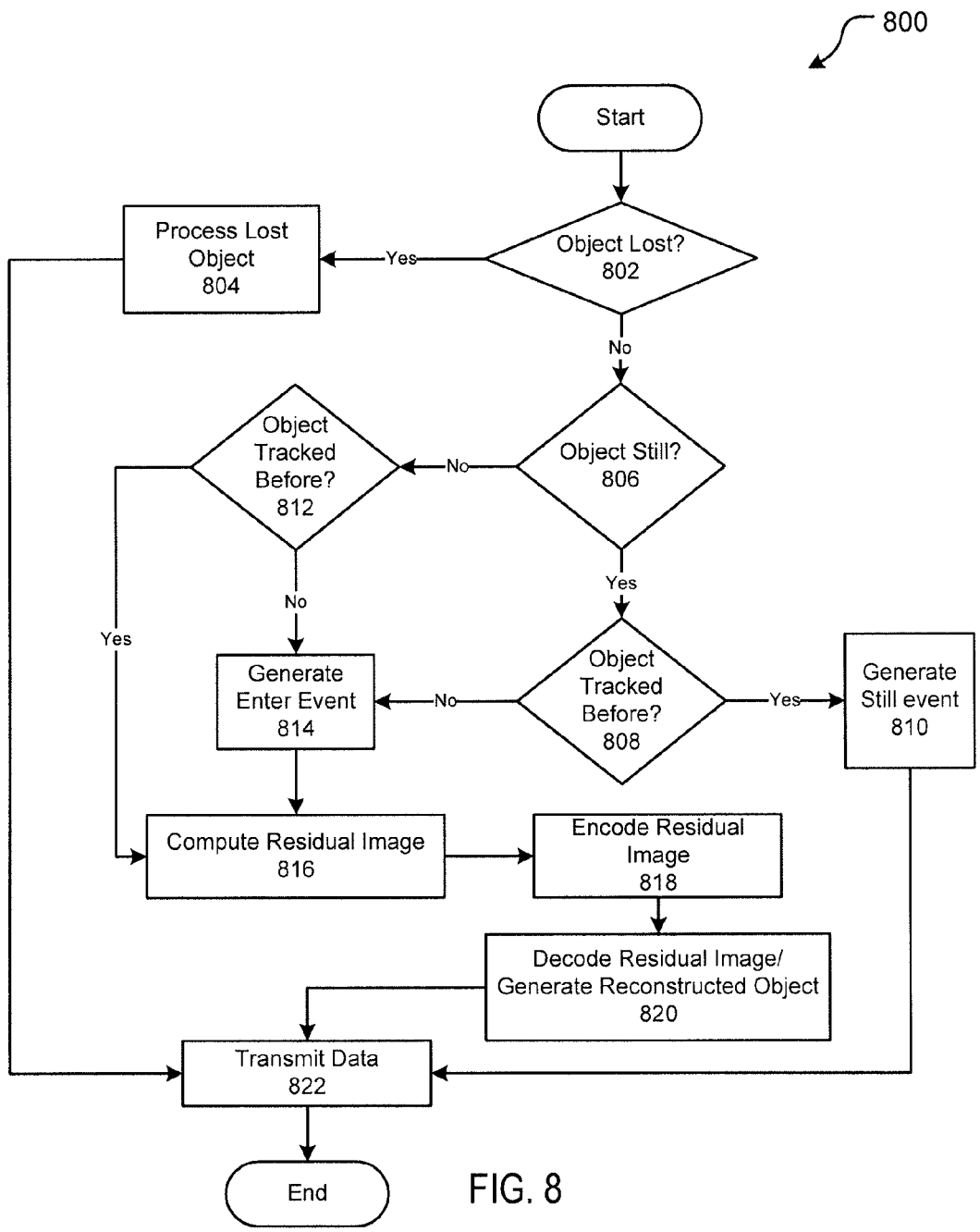
FIG. 8 is a block flow diagram of a process for supporting the encoding and transmission of a foreground-object image.

Referring to FIG. 8, with further reference to FIGS. 1 and 2, a process 800 for supporting the encoding and transmission of an object includes the blocks shown. The process 800 is, however, exemplary only and not limiting. The process 800 can be altered, e.g., by having blocks added, removed, rearranged, and/or performed concurrently. For example, block 822 for transmitting data can be performed prior to block 820. Still other alterations to the process 800 as shown and described are possible.

At decision 802, the processor 204 initiates processing based on a determination as to whether an object is lost. If the object is lost, the processor 204 generates a lost event (e.g., "object_leave_scene" event) for the object at block 804. In some implementations, the background region corresponding to the position where the lost object was previously present is updated accordingly. The regional background updating process is similar to the updating of a background shown in FIG. 6 (via encoding of an entire or residual background image), except that only a region of the background is coded. Information regarding the location of the region of the background to be updated is transmitted with the coded background.

If an object is not lost, the processor 204 determines whether the object is stationary or still at decision 806. The processor 204 can determine whether an object is still by using previously computed metadata (including movement and position information) for the object. For example, the processor can use position information to compare the coordinates of the object in the received frame to the coordinates of the object in a previously received frame.

At decision 808, the processor 204 determines whether the foreground-object has been previously tracked. The processor 204 can determine whether an object has been previously tracked in any suitable manner. For instance, the processor 204 can maintain an objects list containing information for objects present in a previously received frame. In order to determine whether an object has been previously tracked, the processor 204 checks whether the object is present in the list. As another example, the processor 204 can determine whether an object has been previously tracked by comparing a previous frame to the current frame. In particular, the processor 204 checks if the object appears in both frames.

If the processor 204 determines that the foreground-object has been previously tracked at decision 808, the processor 204 generates a still event (e.g., "object_still" event) at block 810. Because the object is currently still, an encoded image of the object does not need to be immediately transmitted. The still object can, instead, be transmitted based on a slower rate or at the same rate as the background. The processing of a still object for transmission can proceed in a manner similar to that shown in blocks 816, 818, 820, and/or 822, except that encoding and decoding can be based on a previously stored image (e.g., a previously stored image of the object, a previously stored frame) instead of a reference background image. In some implementations, the previously stored image can be an image that was previously reconstructed or generated. In some implementations, a still object can be merged into or considered a part of the background. When this happens, the corresponding background region is updated accordingly. The regional background updating process is similar to the updating of a background shown in FIG. 6 (via encoding of an entire or residual background image), except that only a region of the background is coded. Information regarding the location of the updated background region is transmitted with the coded background.

Referring again to block 806, if the processor 204 determines that a foreground-object is not still, the processor 204 determines if the object has been previously tracked at block 812. If the processor determines that the object has not been previously tracked at block 812, the processor 204 generates an enter event (e.g., "object_enter_scene" event) at block 814.

At block 816, the processor 204 computes a residual object image for the foreground-object based on a current reference background image. In particular, the processor 204 determines the difference (e.g., via a subtraction process) between the block of pixels representing the foreground-object and the corresponding block of pixels in the reference background image. At block 818, the processor 204 encodes the residual object image. The processor 204 can encode the residual object using any suitable coding scheme. For example, the processor 204 can use JPEG, JPEG 200 or H.264 intra-coding.

In an alternative implementation, the processor 204 can compute a residual object image based on a previously reconstructed image (e.g., a previously reconstructed image of the object, a previously reconstructed frame). In particular, because the locations of an object in the received frame and in previous frames are known, the processor 204 can estimate a global motion vector for the object's movement. Based on this global movement estimation, the processor 204 can estimate local motion vectors via, for example, SAD or a correlation search based on 8×8 image blocks. The local motion vectors can thereafter be coded with the Huffman code of MPEG-4. Based on the vector estimations, a residual object image can subsequently be generated based on a previously reconstructed image. The residual object image can be encoded using any suitable coding scheme, such as MPEG based and/or H.264 inter-frame coding. By using global motion vectors for an object, local motion vectors of an object image block can be smaller than an image block without global motion estimation.

At block 820, the processor 204 decodes the residual object image previously encoded at block 818. The processor 204 thereafter generates a reconstructed object image (e.g., via an adding process) based on the decoded residual object image and a reference background image or previous frame alternatively depending on different encoding modes. After generating the reconstructed object image, the processor 204 can store the object image in the memory 206 (e.g., in the objects list stored in the memory 206). By decoding and generating a reconstructed object image, the processor 204 can synchronize the object image with the object image decoded at and generated by the receiver 106.

At block 822, the processor 204 transmits data to the receiver 106 based on a specified update rate for foreground-objects (e.g., 15, 24, 29, 30, or 60 frames per second). Transmitted data can include event information (e.g., object has been lost, a new object has entered the frame, etc.) and/or encoded image data. For instance, a video stream can be presented to a user at a rate of 30 frames per second. As a result, updated foreground-object images are sent to the receiver 106 at 1/30 second intervals.

In some implementations, the processor 204 can transmit the image data via communication subsystem 208, which can include a connection to the receiver 106. For example, communication subsystem 208 can include a connected to the receiver 106 over a Wide Area LAN (e.g., the Internet). Transmission of the encoded background image can be facilitated by any suitable transport layer protocol, such as TCP or UDP. In some implementations, the processor 204 checks with the receiver 106 whether transmission of the object images is successful.

In some implementations, the processor 204 can transmit image data for objects based on movement and/or size thresholds. For example, the processor 204 can be configured to only transmit encoded image data for an object if the object has moved at least 20 pixels between frames or if the object has changed from a size of 50 pixels to 100 pixels. The processor 204 can automatically modify the movement/size thresholds based on the current availability of bandwidth.

In certain implementations, the processor 204 can store image data (e.g., encoded object images, background images, etc.) in a transmission buffer. The buffer can be used to temporarily store image data during periods where bandwidth is not high enough to transmit all image data flagged to be sent to the receiver 106. The processor 204 may not be able to transmit all image data to receiver 106 if, for example, a recently processed frame includes a large amount of motion.

In some implementations, the processor 204 can additionally set transmission priorities for encoded object and background images. For example, images for a moving object can be associated with a high priority. Images for stationary objects and backgrounds can be associated with lower priorities. The processor 204 can thereafter transmit images based on the defined priorities (i.e., high priority data is sent before low priority data). In some implementations, the processor 204 can increase the priority of an image based on the time the data has remained in the transmission buffer. For example, the processor 204 can increase the priority of an image if the image has been in the buffer for more than two minutes.

It should be appreciated that the processes shown in FIGS. 6, 7, and 8 can be executed concurrently or sequentially.

Video Data Decoding

Figure 9:
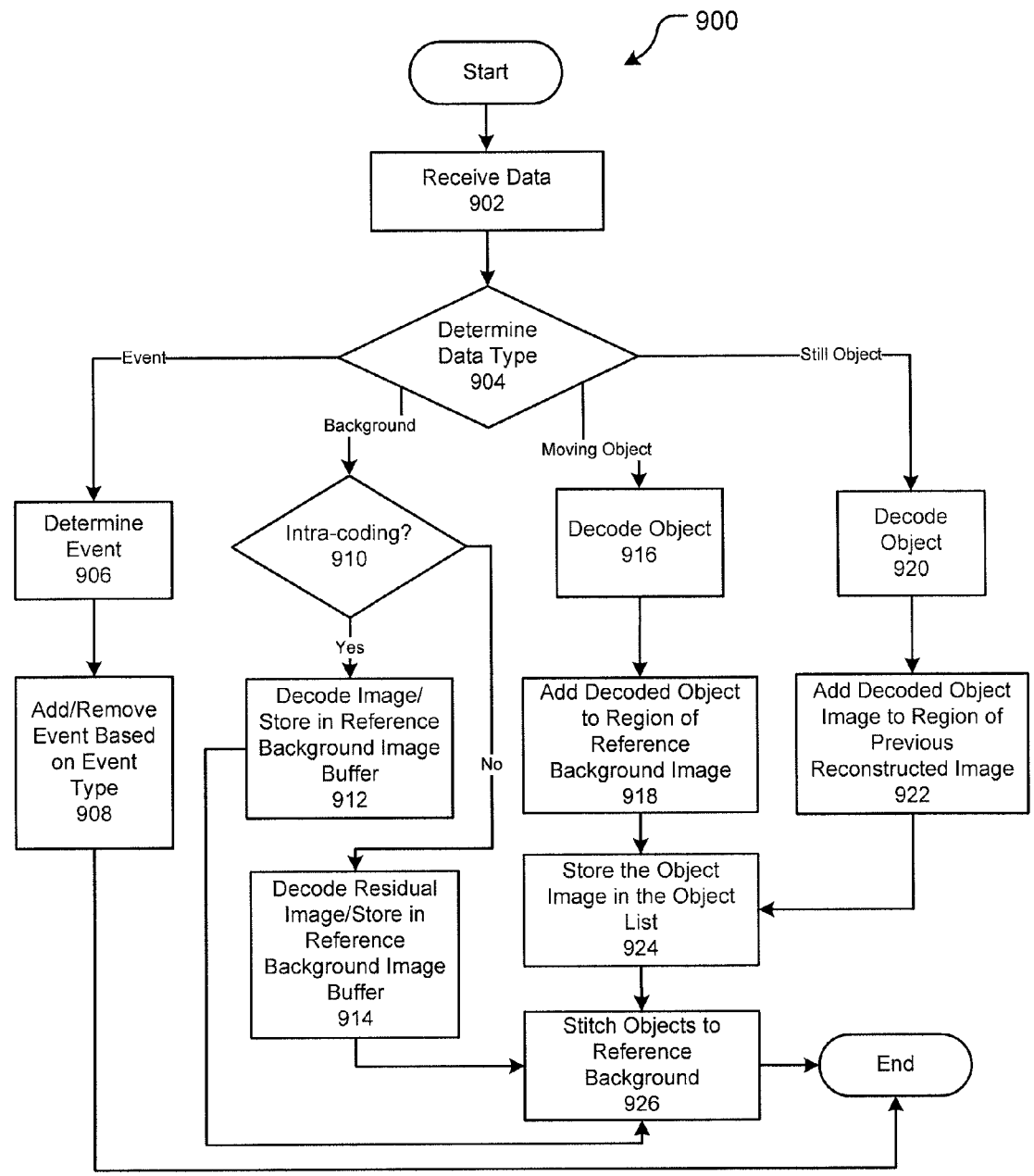
FIG. 9 is a block flow diagram of a process of decoding video data.

Referring to FIG. 9, with further reference to FIGS. 1 and 3, a process 900 for supporting the decoding of video data includes the blocks shown. The process 900 is, however, exemplary only and not limiting. The process 900 can be altered, e.g., by having blocks added, removed, rearranged, and/or performed concurrently.

At block 902, the receiver 106 receives data from the transmitter 102. The data can include event information (e.g., enter event, lost event, etc.), encoded residual object images, encoded residual background images, entire encoded background images, and/or the like. At decision 904, the processor 304 of the receiver 106 determines a data type (e.g., event, background, moving object, still object) for the received data.

If the processor 304 determines that the received data belongs to an event data type at decision 904, the processor 304 identifies the specific event indicated by the data at block 906. For example, the received data can indicate that an object has entered a current frame (e.g., "object_enter_scene" event). As another example, the received data can indicate that an object has left a current frame (e.g., "object_leave scene" event). At block 908, the processor 304 adds or removes an object from an objects list based on the event indicated by the received data. For instance, the processor 304 may have determined that the received event data indicates that an object has entered a current frame. Based on this determination, the processor 304 adds the object to the objects list. As another example, the processor 304 may have determined that the received data indicates that an object has left a scene. As a result, the processor 304 removes the object from the objects list.

Referring again to decision 904, if the processor 304 determines that the data received from the transmitter 102 is of a background type (e.g., an encoded residual background image or an entire encoded background image), the processor 304 determines whether intra-coding should be performed at decision 910.

If the processor 304 determines that intra-coding is to be performed (i.e., the received data is an entire encoded background image), the processor 304 decodes the background image to produce a decoded background image at 912. The processor 304 thereafter stores the decoded background image in a reference background image buffer of the memory 306. In doing so, the decoded background image replaces a current reference background image, and is used as the reference background image in later processing (e.g., used in the stitching of an image for presentation to a user, in the decoding of subsequently received data, etc.).

If the processor 304 determines that intra-coding is not to be performed (i.e., the received data is a residual background image), the processor 304 decodes the residual background image to produce a decoded residual background image at 914. The processor 304 thereafter generates a new reference background image using the decoded residual background image and a current reference background image. The processor 304 subsequently stores the new reference background image in a reference background image buffer of the memory 306. In doing so, the new reference background image replaces the current reference background image and is used as the reference background image in later processing Referring again to decision 904, if the processor 304 determines that the data received from the transmitter 102 is of a moving object type, the processor 304 decodes the data, which is a residual object image, to produce a decoded residual object image at block 916. At block 918, the processor 304 generates a reconstructed object image (e.g., through an adding process) based on the decoded residual object image and a current reference background image or previous frame alternatively depending on different encoding modes. Upon generating the object image, the reconstructed object image can be stored in a buffer of the memory 306.

Referring again to decision 904, if the processor 304 determines that the data received from the transmitter 102 is of a still object type, the processor 304 decodes the data, which can be a residual object image, to produce a decoded residual object image at block 920. At block 922, the processor 304 generates a reconstructed object image (e.g., via an adding process) based on the decoded residual object image and a previously reconstructed image (e.g., previously reconstructed image of the object, a previously reconstructed frame). An alternative way to reproduce a still object is to use the corresponding object image from the objects list directly. In some implementations, upon generating the object image, the reconstructed object image can be stored in a buffer of the memory 306.

At block 924, the processor 304 stores or references the generated object image in the objects list stored in memory 306. At block 926, the processor 304 stitches any objects in the objects list to the current reference background image to generate a video frame. The processor 304 thereafter provides the video frame to, for example, display 302 for presentation to a user. In some implementations, the processor 304 waits until all data received over a certain time period is processed before performing block 926. Illustratively, the processor 304 may receive two pieces of video data including a first encoded object image and a second encoded object image over a ⁄1;30 second time period. The receiver 106 may process each of the images (e.g., decode, etc.) before stitching the images to a reference background image (which may have been received, decoded and stored, for example, five minutes prior), and presenting a generated video frame to a user.

Considerations Regarding the Description

Substantial variations to described configurations can be made in accordance with specific requirements. For example, customized hardware might also be used, and/or particular elements might be implemented in hardware, software (including portable software, such as applets, etc.), or both. Further, connection to other computing devices such as network input/output devices can be employed.

The terms "machine-readable medium" and "computer-readable medium," as used herein, refer to any medium that participates in providing data that causes a machine to operate in a specific fashion. Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code. Various forms of computer-readable media can be involved in carrying one or more sequences of one or more instructions to a processor(s), such as the processors 204 and 304 of the transmitter 102 and the receiver 106 respectively, for execution. Merely by way of example, the instructions can initially be carried on a magnetic disk and/or optical disc of the transmitter 102. The transmitter 102 might load the instructions into its dynamic memory and send the instructions as signals over a transmission medium to be received and/or executed by the receiver 106. These signals, which might be in the form of electromagnetic signals, acoustic signals, optical signals and/or the like, are all examples of carrier waves on which instructions can be encoded, in accordance with various configurations of the invention.

The methods, systems, and devices discussed above are examples. Various configurations can omit, substitute, or add various procedures or components as appropriate. For instance, in alternative configurations, the methods can be performed in an order different from that described, and that various steps can be added, omitted, or combined. Also, features described with respect to certain configurations can be combined in various other configurations. Different aspects and elements of the configurations can be combined in a similar manner. Also, technology evolves and, thus, many of the elements are examples and do not limit the scope of the disclosure or claims.

Specific details are given in the description to provide a thorough understanding of example configurations (including implementations). However, configurations can be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes can be made in the function and arrangement of elements without departing from the spirit or scope of the disclosure.

Further, the preceding description details a video transmission system. However, the systems and methods described herein can be applicable to other transmission systems.

Also, configurations can be described as a process which is depicted as a flow diagram or block diagram. Although each can describe the operations as a sequential process, many of the operations can be performed in parallel or concurrently. In addition, the order of the operations can be rearranged. A process can have additional steps not included in the figure. Furthermore, examples of the methods can be implemented by hardware, software, firmware, middleware, microcode, hardware description languages, or any combination thereof.

When implemented in software, firmware, middleware, or microcode, the program code or code segments to perform the necessary tasks can be stored in a non-transitory computer-readable medium such as a storage medium. Processors can perform the described tasks.

Having described several example configurations, various modifications, alternative constructions, and equivalents can be used without departing from the spirit of the disclosure. For example, the above elements can be components of a larger system, wherein other rules can take precedence over or otherwise modify the application of the invention. Also, a number of steps can be undertaken before, during, or after the above elements are considered. Accordingly, the above description does not bound the scope of the claims.

What is claimed is:

1. A transmission system comprising a processor configured to:
    receive a plurality of frames;
    analyze the plurality of frames;
    determine a current bandwidth available for transmission;
    determine, based on the current bandwidth, at least one of a pixel movement threshold or a pixel size threshold, the pixel movement threshold being a distance between a position in a first frame of a particular image object and a position in a second frame of the particular image object wherein the distance corresponds to a first number of pixels and the pixel size threshold being a difference between a dimension in the first frame of the particular image object and a dimension in the second frame of the particular image object wherein the difference corresponds to a second number of pixels;
    identify foreground-object portions that are distinct from a background portion;
    transmit, for each of the plurality of frames, foreground-object information for an identified foreground-object portion based on the identified foreground-object portion satisfying the at least one of the pixel movement threshold or the pixel size threshold; and
    selectively transmit background information for less than all of the plurality of frames, wherein the background information is transmitted at a periodic rate based on the current bandwidth.

2. The system of claim 1, wherein the foreground-object portions include semantically significant moving objects.

3. The system of claim 1 wherein the processor is further configured to compare features of the particular image object with an identified object in a previously received frame, the features comprising position, speed, movement direction, color, and size.

4. A non-transitory computer readable medium encoded with one or more computer readable instructions that, when executed by a processor, cause the processor to:
    analyze video data from a plurality of images;
    determine a current bandwidth available for transmission;
    determine, based on the current bandwidth, at least one of a pixel movement threshold or a pixel size threshold, the pixel movement threshold being a distance between a position in a first frame of a particular image object and a position in a second frame of the particular image object wherein the distance corresponds to a first number of pixels and the pixel size threshold being a difference between a dimension in the first frame of the particular image object and a dimension in the second frame of the particular image object wherein the difference corresponds to a second number of pixels;
    identify the presence of foreground-object portions that are distinct from a background portion in the video data;
    transmit first portions of the video data, of different images, associated with at least one identified foreground-object portion, based on the at least one identified foreground-object portion satisfying the at least one of the pixel movement threshold or the pixel size threshold, at a first update rate; and
    transmit second portions of the video data, of different images, associated with the background portion at a second update rate, wherein the first update rate is greater than the second update rate.

5. The computer readable medium of claim 4, wherein the instructions that cause the processor to identify the presence of foreground-object portions cause the processor to identify semantically significant movement using a Gaussian model.

6. The computer readable medium of claim 5, wherein the instructions that cause the processor to identify the presence of foreground-object portions cause the processor to identify a region of semantically significant movement as a foreground-object portion.

7. The computer readable medium of claim 4, wherein the first update rate is thirty frames per second.

8. A video data transmission system comprising:
    a processor configured to:
        execute a scene analyzer algorithm for analyzing video data from a plurality of images;
        determine a current bandwidth available for transmission;
        determine, based on the current bandwidth, at least one of a pixel movement or a pixel size threshold, the pixel movement threshold being a distance between a position in a first frame of a particular image object and a position in a second frame of the particular image object wherein the distance corresponds to a first number of pixels and the pixel size threshold being a difference between a dimension in the first frame of the particular image object and a dimension in the second frame of the particular image object wherein the difference corresponds to a second number of pixels;
    identify the presence of foreground-object portions that are distinct from a background portion in the video data; and
        transmit first portions of the video data, of different images, associated with at least one identified foreground-object portion, based on the at least one identified foreground-object portion satisfying the at least one of the pixel movement threshold or the pixel size threshold, at a first update rate; and to transmit second portions of the video data, of different images, associated with the background portion at a second update rate, wherein the first update rate is greater than the second update rate.

9. The system of claim 8, wherein the processor is configured to identify semantically significant movement using a Gaussian model.

10. The system of claim 9, wherein the processor is configured to identify a region of semantically significant movement as a foreground-object portion.

11. The system of claim 8, wherein the first update rate is thirty frames per second.

12. The system of claim 8 wherein the processor is configured to identify semantically significant moving objects as the foreground-object portions.

* * * * *

UNITED STATES PATENT AND TRADEMARK OFFICE
CERTIFICATE OF CORRECTION

| | | |
|---|---|---|
| PATENT NO. | : 9,049,447 B2 | Page 1 of 1 |
| APPLICATION NO. | : 12/982602 | |
| DATED | : June 2, 2015 | |
| INVENTOR(S) | : Millar et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 131 days.

Signed and Sealed this
Twenty-third Day of February, 2016

Michelle K. Lee
*Director of the United States Patent and Trademark Office*